Figure 1:
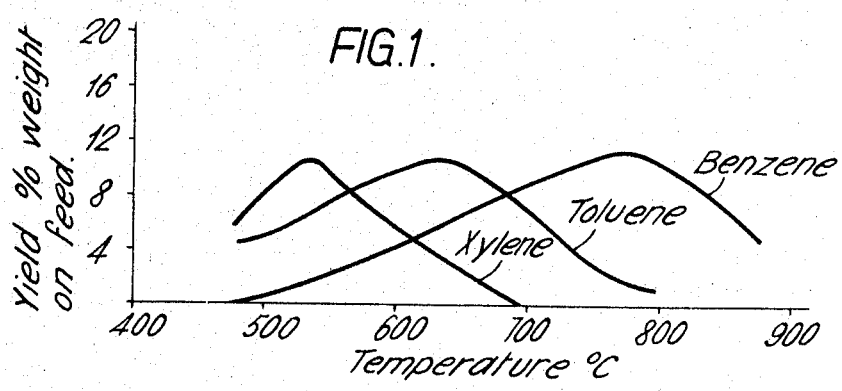

INVENTORS
ANTHONY GEORGE GOBLE
ALAN RICHARD THORNHILL
BY
Morgan, Finnegan, Durham & Pine
ATTORNEYS

United States Patent Office 3,310,597
Patented Mar. 21, 1967

3,310,597
CATALYTIC CRACKING
Anthony George Goble and Alan Richard Thornhill, Sunbury-on-Thames, England, assignors to The British Petroleum Company Limited, London, England, a British joint-stock corporation
Filed June 13, 1962, Ser. No. 202,277
Claims priority, application Great Britain, June 22, 1961, 22,624/61
5 Claims. (Cl. 260—683)

This invention relates to the catalytic cracking of hydrocarbons to produce, particularly, normally-gaseous olefins.

Normally gaseous olefins, for example ethylene and propylene, are extensively used as starting materials for the production of a variety of chemical products. They are normally obtained from heavier hydrocarbons, particularly petroleum fractions, by a thermal cracking process. The process may, if desired, be operated in the presence of steam, in which case it is commonly known as steam cracking or in the presence of inert solid particles, for example sand, in which case it is commonly known as sand cracking. Thermal cracking processes suffer, however, from lack of selectivity in the olefins produced and with the increasing emphasis on propylene as a chemical feedstock it is desirable to obtain products with a higher propylene:ethylene ratio. Catalytic cracking is also a well known process for the production of lower boiling hydrocarbons but the emphasis up to the present has been on the production of normally-liquid products such as gasolines, any normally-gaseous hydrocarbons produced being considered a by-product and kept to a minimum.

The present invention is concerned with a catalyst cracking process for the production of normally-gaseous olefins having a high propylene content and, according to the present invention, normally liquid hydrocarbons are contacted at elevated temperature with a catalyst comprising alumina and combined halogen, the propylene:ethylene ratio in the product being greater than unity.

The preferred halogen is fluorine and the catalyst may be prepared in any convenient manner, for example by contacting alumina with a halogen compound containing halogen together with one or more of the elements, carbon, hydrogen or oxygen under conditions such that halogen combines with the alumina.

Details of one suitable method are given in co-pending U.S. patent application Ser. No. 197,850 filed may 28, 1962, now abandoned.

Suitable halogen contents of the catalyst are in the range 0.1 to 15% wt. preferably 0.25–5% wt. In the complete specification of U.K. Patent No. 956,685 it has been shown that the isomerisation activity of catalysts containing alumina and fluorine is more properly related to the amount of fluorine per unit of catalyst surface area than to the total weight of fluorine, i.e. the optimum fluorine content for any catalyst depends on its surface area. The same considerations may apply here also since it has been found, for example, that catalysts with the same weight of fluorine but different surface areas have different activities. Preferably the amount of fluorine per unit of catalyst surface area is $0.25 \times 10^{-4}$ to $2.0 \times 10^{-4}$ grams/sq. metre.

The support may consist essentially of alumina or it may be a mixture containing a major proportion of alumina and a minor proportion of one or more other refractory oxides preferably selected from Groups III to V of the Periodic Table. Any of the so-called "activated" aluminas normally used as catalyst supports may be used.

In addition to the production of gaseous olefins high in propylene content, the liquid product obtained by the process of the invention has increased aromatic content, and by suitable adjustment of process conditions, substantial yields of individual aromatic hydrocarbons such as benzene, toluene and xylenes can be obtained.

It has been found that for any given contact time, as the operating temperature is increased the yield of propylene increases to a maximum and then falls away. This effect is also observed in the yields of individual aromatics obtained.

The feedstocks to the present process may be the same as those normally used for the thermal cracking processes, for example naphtha fractions boiling within the range $C_4$ to 200° C. or gas-oil fractions boiling within the range 200–450° C.

For a given degree of conversion the process of the present invention operates at a lower temperature than a thermal cracking process, suitable temperatures being for example, within the range 450–800° C. If high propylene yield is the main consideration, particularly suitable temperatures lie within the range 500–700° C. with contact times preferably within the range 0.05–1.0 sec. If high aromatics production is required, a rather broader range of temperature may be required, for example within the ange 500–750° C., with a similar range of contact times. Alkyl aromatics are produced at the lower temperatures of this range, dealkylation to benzene taking place to an increasing extent as the temperature rises. Increase of temperature and decrease of contact time thus increase the degree of conversion up to a given point but the propylene:ethylene ratio at maximum propylene yield appears to be constant independent of contact time. Decrease of contact time increases the temperatures required to give the maximum propylene yield and also decreases the paraffin:olefin ratio.

The catalyst may be used in any convenient form, for example a fluidised or moving bed.

The invention is illustrated by the following examples.

*Example 1*

A catalyst of alumina and combined fluorine, having 6.0% wt. of combined fluorine was prepared as follows:

A sample of eta-alumina, produced by hydrolysis of aluminium isopropoxide followed by subsequent calcination, was contacted at 450° C. for 20 minutes with a stream of carbon tetrafluoride gas ($CF_4$) flowing at 90 ml./min. Afterwards it was allowed to cool in dry nitrogen and stored in a sealed container.

The catalyst was used to crack a light naphtha of Middle East origin having an ASTM boiling range of 37 to 66.5° C. under a range of process conditions. The experiments were carried out in a microreactor and the products were analysed by gas chromatography. The contact time was calculated as the catalyst volume in millilitres divided by the feed hydrocarbon rate in millilitres of vapour per second, corrected for pressure and to a temperature of 800° C. Process conditions and product yields are given in Table 1 below.

TABLE 1

|  | Sand Cracking | | Cracking with alumina/fluorine catalyst | | |
| --- | --- | --- | --- | --- | --- |
| Equivalent contact time at 800° C., sec | 0.93 | 2.40 | 0.057 | 0.22 | 0.89 |
| Temperature, ° C | 785 | 775 | 670 | 640 | 590 |
| Pressure, p.s.i.g | 15 | 5 | 15 | 15 | 15 |
| Product Yields: | | | | | |
| Methane, percent wt. on feed | 14 | 18 | 6 | 7 | 5 |
| Ethane, percent wt. on feed | 3 | 2 | 5 | 5 | 4 |
| Ethylene, percent wt. on feed | 23 | 26 | 18 | 20 | 12 |
| Propane, percent wt. on feed | Tr. | Tr. | 5 | 8 | 12 |
| Propylene, percent wt. on feed | 17 | 20 | 25 | 25 | 19 |
| Total Conversion to $C_1$–$C_3$ Hydrocarbons, percent wt. on feed | 57 | 66 | 59 | 65 | 52 |
| Propylene/ethylene wt. ratio | 0.73 | 0.74 | 1.42 | 1.28 | 1.43 |
| Propane/propylene wt. ratio | | | 0.18 | 0.32 | 0.63 |

The table shows that, as compared to sand cracking, cracking with an alumina/fluorine catalyst gives a similar conversion at a much lower temperature with a considerably higher propylene:ethylene wt. ratio. It also shows a relatively constant propylene:ethylene ratio independent of contact time.

*Example 2*

A catalyst of alumina and combined fluorine, containing 1.24% weight of fluorine, was prepared as follows:

20 mls. of commercial eta-alumina was allowed to soak in 100 mls. of a hydrofluoric acid solution prepared by mixing 0.25 ml. of 40% volume hydrofluoric acid in 100 mls. of water. The catalyst was washed with 100 mls. of water and dried at 120° C.

The catalyst was used to crack a light gas oil, ASTM boiling range 208–363° C. in a micro-reactor at various temperatures within the range 350–650° C. but at constant pressure and contact time. The products were analysed by gas chromatography and the maximum yield of propylene was obtained at 515° C.

Process conditions, product yields and comparable figures for sand cracking are given in Table 2 below:

TABLE 2

| Conditions and Yields at Maximum Propylene Yield | Sand Cracking | Cracking with Alumina/Fluorine Catalyst |
| --- | --- | --- |
| Equivalent contact time at 800° C., sec | 0.87 | 0.87 |
| Temperature, ° C | 750 | 515 |
| Pressure, p.s.i.g | 15 | 15 |
| Product Yields: | | |
| Methane, percent wt. on feed | 10 | 2 |
| Ethane, percent wt. on feed | 4 | 1 |
| Ethylene, percent wt. on feed | 21 | 8 |
| Propane, percent wt. on feed | (¹) | 3 |
| Propylene, percent wt. on feed | 16 | 19 |
| Total conversion to $C_1$–$C_3$ hydrocarbons, percent wt. on feed | 51 | 33 |
| Propylene/ethylene weight ratio | 0.76 | 2.4 |
| Propane/propylene weight ratio | | 0.11 |

¹ Tr. (<0.2).

The table shows that, compared to sand cracking, cracking with the alumina/fluorine catalyst gives a greater yield of propylene at a much lower temperature and with a much higher propylene:ethylene weight ratio.

The effect on aromatic yields is shown in the accompanying graph, FIG. 1. It is seen that a maximum benzene yield of 11.2% weight is obtained at 775° C. For comparison sand cracking gave 5.6% of benzene at 775° C. increasing to 10% at 900° C. A maximum toluene yield of 10.7% weight was obtained at 430° C. compared with 1.6% using sand at the same temperature. A maximum yield of xylene of 10.5% weight was obtained at 535° C. compared with under 2% using sand. Thus larger yields of aromatics are obtained using alumina-fluorine catalyst and at lower temperatures than when using sand.

The aromatic yields corresponding to the process conditions shown in Table 2 are given in the following Table 3:

TABLE 3

|  | Sand Cracking | Cracking with Alumina/Fluorine Catalyst |
| --- | --- | --- |
| Temperature, ° C | 750 | 515 |
| Product Yields: | | |
| Benzene, percent wt. on feed | 4.3 | 1.2 |
| Toluene, percent wt. on feed | 3.2 | 5.6 |
| Xylenes, percent wt. on feed | <2 | 9.3 |
| Total $C_6$–$C_8$ aromatics, percent wt. on feed | <9.5 | 16.1 |
| Aromatic, content on liquid product,¹ percent wt | <16 | 24 |

¹ Expressed as $\dfrac{\text{Percent weight on feed of } C_6\text{–}C_8 \text{ aromatics}}{100 - \text{Total conversion to } C_1\text{–}C_3 \text{ hydrocarbons}} \times 100$ (percent weight on feed)

The total $C_6$–$C_8$ aromatic yield increases with temperature to 850° C. with sand, and to a maximum at 600° C. with the alumina/fluorine catalyst. The yields at these temperatures are shown in the following Table 4:

TABLE 4

|  | Sand Cracking | Cracking with Alumina/Fluorine Catalyst |
| --- | --- | --- |
| Temperature, ° C | 850 | 600 |
| Product Yields: | | |
| Benzene, percent wt. on feed | 9.2 | 4.3 |
| Toluene, percent wt. on feed | 2.9 | 9.8 |
| Xylenes, percent wt. on feed | | 5.8 |
| Total $C_6$–$C_8$ aromatics, percent wt. on feed | 12.1 | 19.9 |

*Example 3*

Figure 2:
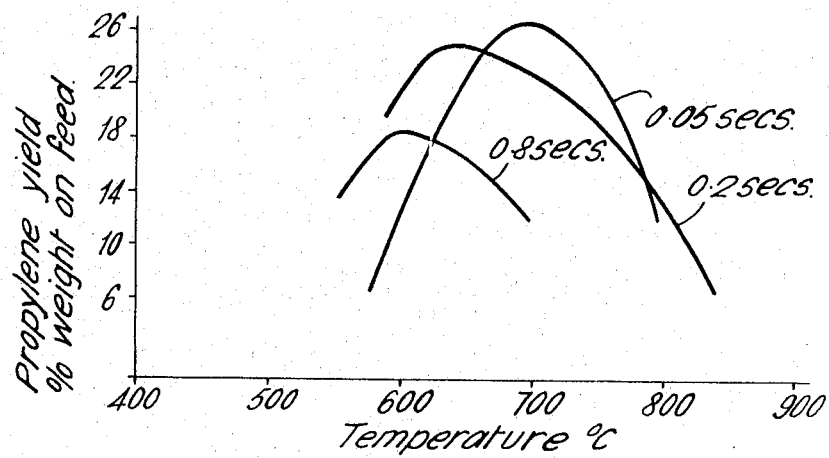

The feedstock of Example 1 was contacted with the catalyst of Example 1 at various contact times in a micro-reactor, the temperatures being increased in each case. The effect on propylene yield is shown in the accompanying graph FIG. 2. It is seen that the propylene yield rises to a peak in each case, the shorter the contact time the higher the peak and the higher the temperature required to attain the peak.

*Example 4*

Figure 3:
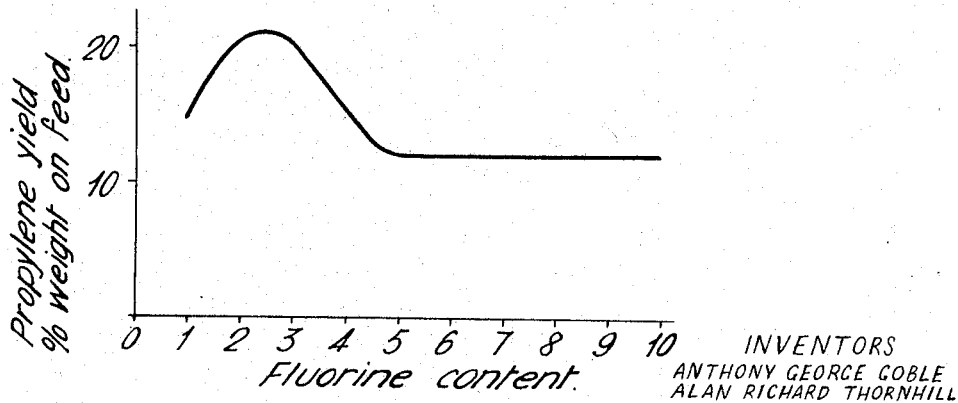

The feedstock of Example 2 was treated at 615° C. and 15 p.s.i.g. in a micro-reactor with a series of catalysts comprising predominantly eta-alumina having a surface area of 193 m². per gram and containing varying quantities of fluorine, the contact time in each case being 0.8 second. The propylene yield in each case was determined by gas chromatography. The effect of fluorine content is illustrated in the accompanying graph, FIG. 3.

We claim:
1. A process comprising contacting a normally liquid hydrocarbon feedstock, which is a petroleum distillate boiling in the range $C_4$–450° C., at an elevated temperature in the range of 450–800° C., with a catalyst consisting essentially of alumina, in a major proportion, and combined fluorine in an amount of 0.1 to 15% by weight of the catalyst, the amount of fluorine per unit of catalyst surface area being $0.25 \times 10^{-4}$ to $2.0 \times 10^{-4}$ g./sq. meter; and, recovering a product containing normally gaseous olefins, the propylene:ethylene weight ratio in the product being greater than unity.

2. A process as claimed in claim 1 wherein the catalyst contains between 0.25–5% weight of halogen.

3. A process as claimed in claim 1 wherein the temperature is in the range 500–750° C.

4. A process as claimed in claim 1 wherein the temperature is in the range 500–700° C.

5. A process as claimed in claim 1 wherein the contact time is within the range 0.05–1.0 second.

References Cited by the Examiner
UNITED STATES PATENTS

| | | | |
|---|---|---|---|
| 2,479,110 | 8/1949 | Haensel | 208—139 |
| 2,848,380 | 8/1958 | Thomas | 252—441 X |
| 2,859,174 | 11/1958 | Adams et al. | 208—115 |
| 2,937,213 | 5/1960 | Hutchings et al. | 260—683 |
| 2,951,883 | 9/1960 | Kroeper et al. | 260—683 |
| 3,121,696 | 2/1964 | Hoekstra | 252—441 |
| 3,138,559 | 6/1964 | Hauptschein et al. | 252—441 X |

DELBERT E. GANTZ, *Primary Examiner.*

ALPHONSO D. SULLIVAN, *Examiner.*

C. E. SPRESSER, JR., *Assistant Examiner.*